(12) United States Patent
Yu

(10) Patent No.: US 9,347,348 B2
(45) Date of Patent: May 24, 2016

(54) ACTIVE REGENERATION CONTROL DEVICE FOR A DIESEL PARTICULATE FILTER

(71) Applicant: DOOSAN INFRACORE CO., LTD., Incheon (KR)

(72) Inventor: Jin Hwan Yu, Incheon (KR)

(73) Assignee: Doosan Infracore Co., Ltd., Incheon (KR)

( * ) Notice: Subject to any disclaimer, the term of this patent is extended or adjusted under 35 U.S.C. 154(b) by 0 days.

(21) Appl. No.: 14/368,168

(22) PCT Filed: Dec. 4, 2012

(86) PCT No.: PCT/KR2012/010399
§ 371 (c)(1),
(2) Date: Jun. 23, 2014

(87) PCT Pub. No.: WO2013/094894
PCT Pub. Date: Jun. 27, 2013

(65) Prior Publication Data
US 2015/0000257 A1    Jan. 1, 2015

(30) Foreign Application Priority Data
Dec. 23, 2011    (KR) .......................... 10-2011-0140702

(51) Int. Cl.
*F01N 3/18*    (2006.01)
*F01N 3/023*   (2006.01)
*F01N 9/00*    (2006.01)

(52) U.S. Cl.
CPC .............. *F01N 3/023* (2013.01); *F01N 9/002* (2013.01); *F01N 3/0232* (2013.01);
(Continued)

(58) Field of Classification Search
CPC ... F01N 3/0232; F01N 9/002; F01N 2550/04; F01N 2900/0402; F01N 2900/0412; F01N 2900/0418; F01N 2900/0421; F01N 2900/0422; F01N 2900/1606; F01N 2900/1611
USPC .............................. 60/277, 294, 295, 297, 311
See application file for complete search history.

(56) References Cited

U.S. PATENT DOCUMENTS 5,121,601 A * 6/1992 Kammel ......................... 60/275
2008/0134669 A1 6/2008 Lange
(Continued)

FOREIGN PATENT DOCUMENTS

EP    1852581 A1    11/2007
EP    2698512 A1    2/2014
(Continued)

OTHER PUBLICATIONS

Search Report dated Mar. 13, 2013 and written in Korean with English translation for International Patent Application No. PCT/KR2012/010399 filed Dec. 4, 2012, 5 pages.
(Continued)

*Primary Examiner* — Jorge Leon, Jr.
(74) *Attorney, Agent, or Firm* — John D. Veldhuis-Kroeze; Westman, Champlin & Koehler, P.A.

(57) ABSTRACT

An active regeneration control device for a diesel particulate filter (DPF) according to the present disclosure includes: an active regeneration determining unit judging an active regeneration time of the (DPF); an active regeneration signal generating unit generating an active regeneration signal according to the decision of the active regeneration determining unit; and an active regeneration inducing unit. The active regeneration inducing unit induces the active regeneration when the active regeneration is not performed after the active regeneration signal is generated.

5 Claims, 4 Drawing Sheets

(52) U.S. Cl.
CPC .... *F01N 2590/08* (2013.01); *F01N 2900/0402* (2013.01); *F01N 2900/0412* (2013.01); *F01N 2900/0418* (2013.01); *F01N 2900/0421* (2013.01); *F01N 2900/0422* (2013.01); *F01N 2900/1606* (2013.01); *F01N 2900/1611* (2013.01); *Y02T 10/47* (2013.01)

(56) References Cited

U.S. PATENT DOCUMENTS

| | | | |
|---|---|---|---|
| 2010/0242443 A1* | 9/2010 | Kodama et al. | 60/277 |
| 2011/0131951 A1* | 6/2011 | Arrigoni et al. | 60/274 |
| 2012/0180463 A1* | 7/2012 | Oohashi et al. | 60/297 |
| 2012/0204537 A1* | 8/2012 | Dea et al. | 60/273 |

FOREIGN PATENT DOCUMENTS

| | | |
|---|---|---|
| JP | 2006-037925 A | 2/2006 |
| JP | 3925484 | 6/2007 |
| JP | 3966272 | 8/2007 |
| JP | 4273911 | 3/2009 |

OTHER PUBLICATIONS

European Search Report mailed Jul. 10, 2015 for corresponding European Application No. 12861012.8, 7 pages.

* cited by examiner

ACTIVE REGENERATION CONTROL DEVICE FOR A DIESEL PARTICULATE FILTER

CROSS-REFERENCE TO RELATED APPLICATION

This application is a Section 371 National Stage Application of International Application No. PCT/KR2012/010399, filed Dec. 4, 2012 and published, not in English, as WO 2013/094894 on Jun. 27, 2013

FIELD OF THE DISCLOSURE

The present disclosure relates to an active regeneration control device for a diesel particulate filter (hereinafter, referred to as 'DPF'), and more particularly, to an active regeneration control device for a DPF that induces a driver to perform active regeneration of the DPF at an optimized time.

BACKGROUND OF THE DISCLOSURE

In recent years, as a concern about an earth environment has increased, as a largest main culprit of air quality deterioration in a downtown area, a harmful substance discharged by a vehicle is considered. In particular, since a diesel engine adopting a compression ignition method in which a combustion temperature is lower than that of a gasoline engine which is a flame ignition method discharges a relatively large amount of nitrogen oxide and a particulate matter (hereinafter, referred to as 'PM'), a discharge gas standard is continuously intensified through a regulation in the country and a foreign country.

As a result, a DPF for reducing a PM discharge amount has been developed and control logics therefor are being developed. Even at present, a lot of engine mounting companies are developing a lot of control logics in order to secure a DPF system. In an automobile industry sector, the DPF system has already been mounted and starts to be mass-produced, and as a result, most of the control logics have been developed suitably for an automobile. However, a driving condition and a driving area of an engine for the automobile and an engine for commercial equipment are fundamentally different from each other. Therefore, a DPF control device considering this, that is, considering the driving condition of the engine for the commercial equipment is required.

One of the DPF control logics considering the driving condition of the engine for the commercial equipment is active regeneration that allows the driver to perform DPF regeneration at a desired time. The active regeneration may be implemented by a simple manual switch and includes a function to actively prevent DPF regeneration in order to avoid a fire, or the like caused by automatic regeneration in a dangerous space due to a driving characteristic of the commercial equipment. Active regeneration by the manual switch is a useful control logic that allows the driver to prevent DPF regeneration in the dangerous area or allows the driver to regenerate the DPF at a desired time and a safe place when the DPF generation is difficult due to an equipment driving characteristic, and it is difficult to secure safety of the DPF system at a predetermined time.

However, since it is impossible for the driver to set an optimized time with respect to the active regeneration of himself/herself, too frequent active regeneration or too rare active regeneration may be performed depending on a driver's tendency. Therefore, efficiency of the regeneration of the DPF deteriorates or durability of the DPF deteriorates.

The discussion above is merely provided for general background information and is not intended to be used as an aid in determining the scope of the claimed subject matter.

SUMMARY

This summary and the abstract are provided to introduce a selection of concepts in a simplified form that are further described below in the Detailed Description. The summary and the abstract are not intended to identify key features or essential features of the claimed subject matter, nor are they intended to be used as an aid in determining the scope of the claimed subject matter.

The present disclosure is contrived to solve the aforementioned problem and is to provide a control device for objectively optimizing a time of active regeneration of a DPF.

Further, the present disclosure is to provide a control device that allows a driver to perform DPF regeneration at an optimized time by providing a time of active regeneration of a DPF to the driver by a manual switch.

In order to implement such an object, an active regeneration control device for a diesel particulate filter (DPF) according to an exemplary embodiment of the present disclosure includes: an active regeneration determining unit including one selected from a group that consists of a DPF regeneration process based active regeneration determining unit, a soot amount based active regeneration determining unit, an in-DPF soot distribution based active regeneration determining unit, an ash learning based on active regeneration determining unit, and a DPF regeneration frequency based active regeneration determining unit to judge an active regeneration time of the DPF; an active regeneration signal generating unit generating an active regeneration signal according to the decision of the active regeneration determining unit; and an active regeneration inducing unit inducing the active regeneration when the active regeneration is not performed after the active regeneration signal is generated.

According to another exemplary embodiment, the DPF regeneration process based active regeneration determining unit may extract the number of DPF regeneration times which is abnormally progressed based the regeneration data based on previous regeneration data, and decide active regeneration when the number of DPF regeneration times which is abnormally progressed is equal to or more than a predetermined value.

According to yet another exemplary embodiment, the soot amount based active regeneration determining unit may decide active regeneration when a soot measurement amount reaches a predetermined value based on the soot measurement amount in the DPF.

According to yet another exemplary embodiment, the in-DPF soot distribution based active regeneration determining unit may decide active regeneration when an accumulated engine driving time measurement value reaches a predetermined value based on the accumulated engine driving time measurement value after the DPF regeneration.

According to yet another exemplary embodiment, the ash learning based active regeneration determining unit may decide active regeneration when an accumulated engine driving time measurement value reaches a predetermined value based on the accumulated engine driving time measurement value after succeeding in the previous ash learning.

According to yet another exemplary embodiment, the DPF regeneration frequency based active regeneration determining unit may decide active regeneration when the regeneration accumulation hour reaches a predetermined value based on a regeneration accumulation hour measurement value for a predetermined engine driving time.

According to an exemplary embodiment of the present disclosure, a time of active regeneration can be objectively optimized and judged with respect to a diesel automobile and diesel commercial equipment that are mounted with a manual switch for active regeneration of a DPF. As a result, durability of a DPF system itself can be maintained and a burden to an engine such as dilution of engine oil caused by abnormal regeneration of the DPF, or the like can be reduced.

DETAILED DESCRIPTION

Hereinafter, exemplary embodiments of the present disclosure will be described in more detail with reference to the accompanying drawings. However, the present disclosure is not limited to the exemplary embodiments described herein and may be implemented in other forms. On the contrary, the exemplary embodiments introduced herein are provided to make disclosed contents thorough and complete and sufficiently transfer the spirit of the present disclosure to those skilled in the art.

Automatic regeneration described in the specification means a regeneration process which is automatically performed by an electronic control unit (hereinafter, referred to as 'ECU') without an operation by a driver when a predetermined regeneration condition is met. Contrary to this, active regeneration means a regeneration process in which the driver operates a manual switch to actively perform regeneration process.

Figure 1:
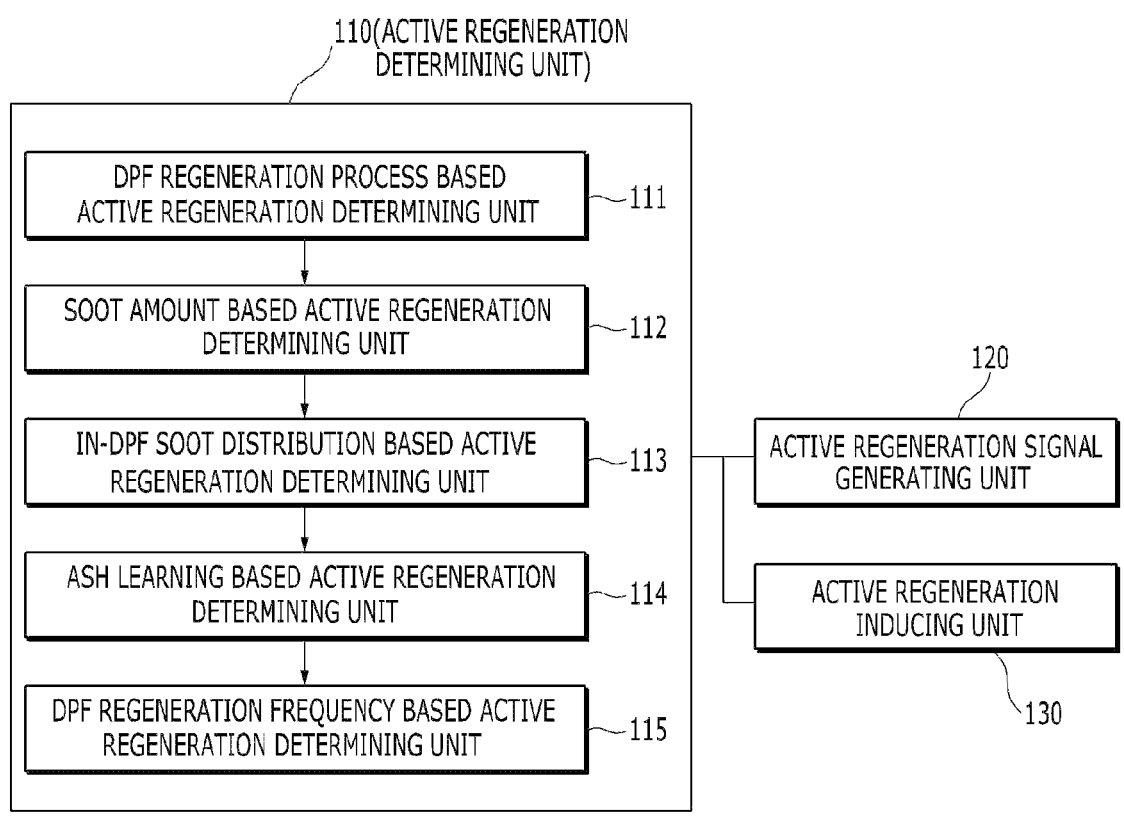
FIG. 1 is a block diagram schematically illustrating an active regeneration control device for a DPF according to an exemplary embodiment of the present disclosure.

FIG. 1 is a block diagram schematically illustrating an active regeneration control device for a DPF according to an exemplary embodiment of the present disclosure. Referring to FIG. 1, an active regeneration control device for a DPF includes an active regeneration determining unit 110, an active regeneration signal generating unit 120, and an active regeneration inducing unit 130. The active regeneration determining unit 110 collects and analyzes various DPF regeneration related data to be described below to judge an optimized active regeneration time. As one example, the active regeneration determining unit 110 may include a DPF regeneration process based active regeneration determining unit 111, a soot amount based active regeneration determining unit 112, an in-DPF soot distribution based active regeneration determining unit 113, an ash learning based active regeneration determining unit 114 or a DPF regeneration frequency based active regeneration determining unit 115. The active regeneration determining unit 110 may include any one or two or more of the plurality of determining units. A detailed constitution and functions of the active regeneration determining unit 110 will be hereinafter described in detail with reference to FIGS. 2 to 6.

The active regeneration signal generating unit 120 may generate a signal to notify an active regeneration time when active regeneration is decided by decision of the active regeneration determining unit 110. As one example, the signal flickers on a display of a gauge to instruct a driver to perform active regeneration.

The active regeneration inducing unit 130 performs a function to urge the driver to more strongly perform active regeneration when the driver does not operate a manual switch to perform the active regeneration even after the signal to notify the active regeneration is generated. As one example, when active regeneration of the DPF is decided by the active regeneration determining unit 110, the driver needs to perform the active regeneration without any further delay. However, some drivers may continuously drive while disregarding such a warning. In this case, the active regeneration is delayed, and as a result, durability of an engine or a DPF system is damaged. Therefore, as a measure to surely induce the driver to execute the DPF active regeneration which needs to be performed, the active regeneration inducing unit 130 is placed. The active regeneration inducing unit 130 measures an accumulated engine operating time after the active regeneration signal is generated and may perform a function to reduce an engine output when the accumulated engine operating time is more than a set value. As one example, the set value of the accumulated operating time may be approximately 20 to 30 hours. As such, when the engine output is reduced, the driver may not perform a normal work, and as a result, the driver is induced to perform a work for the active regeneration.

Figure 2:
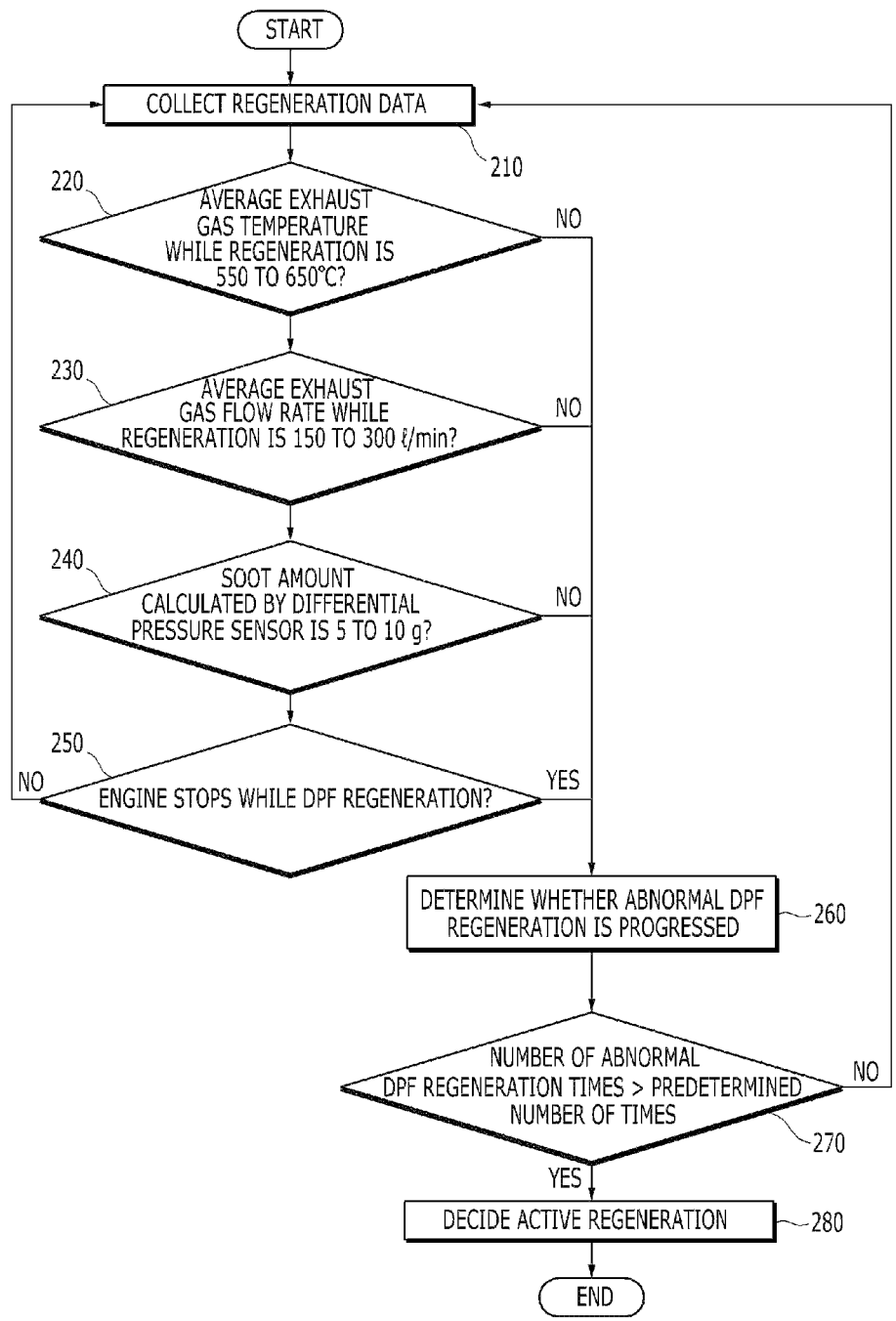
FIG. 2 is a block diagram illustrating a function of a DPF regeneration process based active regeneration determining unit according to the exemplary embodiment of the present disclosure.

FIG. 2 is a block diagram illustrating a function of a DPF regeneration process based active regeneration determining unit according to the exemplary embodiment of the present disclosure. Referring to FIG. 2, the DPF regeneration process based active regeneration determining unit 111 collects regeneration data in block 210. The regeneration data may include all of data of automatic regeneration and active regeneration which were previously performed.

Referring to block 220, it is examined whether an average exhaust gas temperature in the regeneration data is in the range of 550 to 650° C. Only when the average exhaust gas temperature is within the temperature range, soot may be normally burnt without damaging the DPF. When the average exhaust gas temperature is outside the temperature range while regeneration, it is judged that the regeneration is abnormally performed in block 260. When the average exhaust gas temperature is within the temperature range while regeneration, the process moves to block 230.

In the block 230, it is examined whether an average exhaust gas flow in the regeneration data is within the range of 150 to 300 l/min. Only when the average exhaust gas flow rate is within the flow rate range, soot may be normally burnt in all parts of the DPF. As one example, when the flow rate is less than the range, a desired exhaust gas temperature may not be maintained at an end of the DPF and soot is not burnt but may remain, and as a result, the DPF may be damaged while subsequent DPF regeneration is performed. When the average exhaust gas flow rate is outside the flow rate range while regeneration, it is judged that the regeneration is abnormally performed in the block 260. When the average exhaust gas flow rate is within the flow rate range while regeneration is performed, the process moves to block 240.

In the block 240, it is examined whether a soot amount calculated by a differential pressure sensor is in the range of 5 to 10 g. That is, differential pressure at both ends of the DPF is measured by the differential pressure sensor installed at both ends of the DPF to calculate the amount of soot accumulated in the DPF. Even though the DPF regeneration is completed, when the soot amount is more than 5 to 10 g, it may determined that the DPF regeneration is not normally completed and a problem may occur in the DPF system. As such, when the soot amount while regeneration is more than the range, it is judged that the regeneration is abnormally performed in the block 260. When the soot amount while regeneration is within the range, the process moves to block 250.

In the block 250, it is examined whether an engine stop phenomenon occurs while DPF regeneration. When the engine stop phenomenon occurs while regeneration, soot is not normally burnt. As a result, when the engine stop phenomenon occurs while regeneration, it is judged that the regeneration is abnormally progressed in the block 260. When the engine stop phenomenon does not occur while regeneration, the process moves to the block 210 to collect new regeneration data.

In the block 260, it is determined that the DPF regeneration is abnormally performed through meeting of a judgment requirement of the blocks 220 to 250. The judgment of the abnormal DPF regeneration may be stored in a memory of the electronic control unit (ECU) every time.

In block 270, it is examined whether the number of abnormal DPF regeneration judged in the block 260 is equal to or more than a predetermined number of times. As one example, the predetermined number of times may be 3 times to 5 times and as another example, the predetermined number of times may be consecutively set as 3 times to 5 times. When the abnormal number of DPF regeneration times is equal to or more than the predetermined number of times, active regeneration is decided. When the abnormal number of DPF regeneration times is less than the predetermined number of times, the process moves to the block 210 to collect new regeneration data.

According to some exemplary embodiments, a determination sequence may be changed in each of the determination process of the blocks 220 to 250. As one example, the block 230 is first progressed and thereafter, the blocks 220, 240, and 250 may be progressed in sequence. Further, one or more among the determination processes of the blocks 220 to 250 are selected and only the selected determination processes may be progressed.

Figure 3:
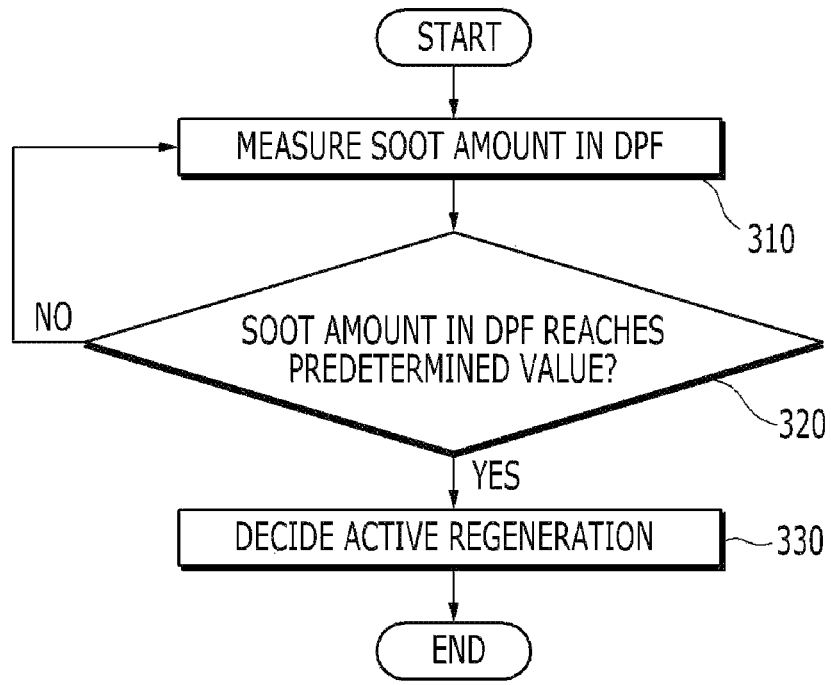
FIG. 3 is a block diagram illustrating a function of the active generation determining unit based on a soot amount according to the exemplary embodiment of the present disclosure.

FIG. 3 is a block diagram illustrating a function of the active generation determining unit based on a soot amount according to the exemplary embodiment of the present disclosure. In a general situation, when the soot amount of approximately 6 to 8 g/l is accumulated in the DPF, the electronic control unit (ECU) automatically performs the DPF regeneration. However, in the driving condition, in which the DPF regeneration may not be progressed or driving is continued within a short driving time, the DPF regeneration is not normally performed but the soot may be continuously accumulated. According to an inventor, a maximum temperature in the DPF during the regeneration process is in direct proportion to the soot amount in the DPF at that time. When normal regeneration is not performed even though excessive soot is accumulated, subsequent regeneration may be progressed at an excessively high temperature, causing a problem to occur in the DPF system. In order to prevent the problem, when a predetermined amount of soot is accumulated in the DPF, the DPF active regeneration may be decided in order to protect the DPF system.

In detail, referring to a block 310, the soot amount in the DPF is measured. In addition, in a block 320, it is examined whether the soot amount in the DPF reaches a predetermined amount. As one example, the predetermined amount may be 6 to 8 g/l. When the soot amount in the DPF reaches the predetermined amount, the active regeneration is decided in a block 330. When the soot amount in the DPF does not reach the predetermined amount, the process moves to the block 310.

Figure 4:
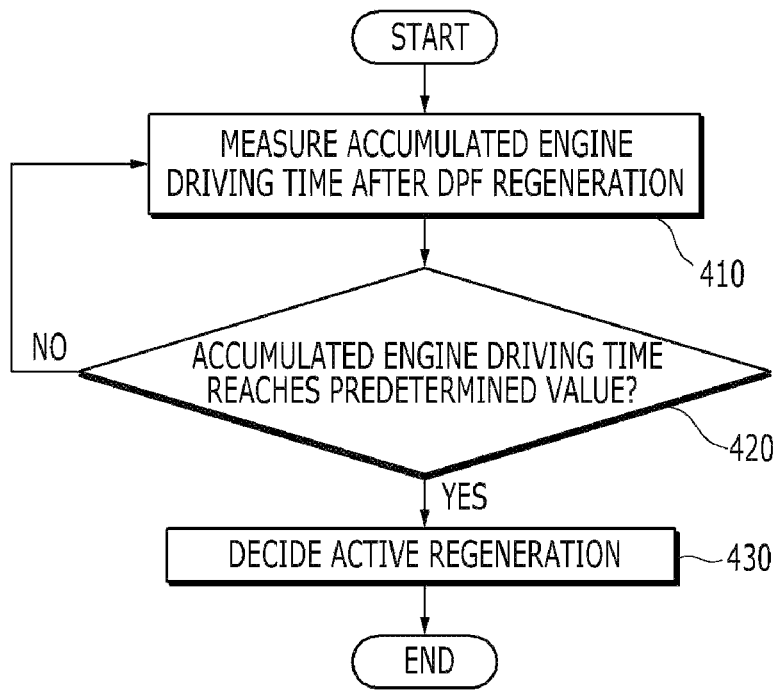
FIG. 4 is a block diagram illustrating a function of an active generation determining unit based on a soot distribution in the DPF according to the exemplary embodiment of the present disclosure.

FIG. 4 is a block diagram illustrating a function of an active generation determining unit based on a soot distribution in the DPF according to the exemplary embodiment of the present disclosure. In general, if the driving condition is advantageous in the DPF automatic regeneration, a total soot amount in the DPF is not significantly increased by the periodic automatic regeneration, but the soot distribution in the DPF may be negatively changed. That is, soot density is low at the center of the DPF having a relatively high exhaust temperature, but the soot density is high at an edge having a relatively low exhaust temperature. When regeneration occurs in this state, no problem occurs in the area having low soot density, but a soot oxidation temperature is increased at the edge having high soot density, and as a result, thermal stress is increased throughout the DPF, and as a result, a problem may occur in the DPF. This may become a phenomenon that threatens durability of the DPF system and in order to prevent the phenomenon, when an accumulated engine driving time reaches a predetermined value after the DPF regeneration is completed, the DPF active regeneration may be decided.

In detail, referring to a block 410, the accumulated engine driving time after the DPF regeneration is measured. In addition, in a block 420, it is examined whether the accumulated engine driving time reaches a predetermined value. As one example, the predetermined value may be approximately 30 to 80 hours. When the accumulated engine driving time reaches the predetermined value, the active regeneration is decided in a block 430. When the accumulated engine driving time does not reach the predetermined value, the process returns to the block 410.

Figure 5:
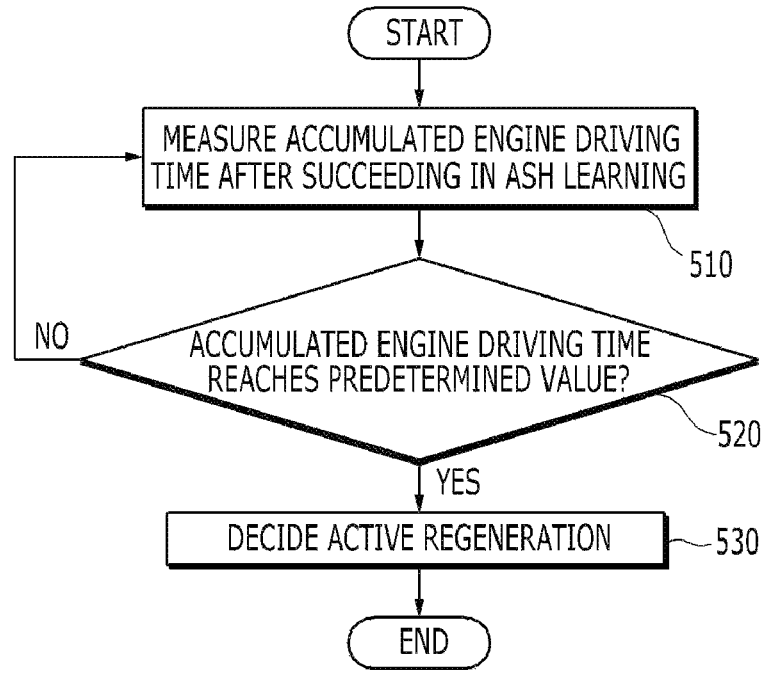
FIG. 5 is a block diagram illustrating a function of an active generation determining unit based on ash learning according to the exemplary embodiment of the present disclosure.

FIG. 5 is a block diagram illustrating a function of an active generation determining unit based on ash learning according to the exemplary embodiment of the present disclosure. In general, most particulates are oxidized to carbon dioxide ($CO_2$) to evade the DPF in a gas state by the DPF regeneration. However, since ash components included in fuel and oil components are not oxidized, the ash components may be continuously accumulated in the DPF in an ash form. When the ash components are accumulated in the DPF, a calculation error may be caused at the time of calculating the soot amount calculated by differential pressure of the DPF. In order to reduce such an error, a calculation logic called ash learning that measures how much ash is accumulated in the DPF is used. However, the ash learning is performed under a steady driving condition by avoiding a transient driving condition in order to increase accuracy thereof. As one example, in the automobile DPF system, the ash learning is performed in cruise driving in an express way or a principal road. However, a commercial diesel engine is manufactured by an all speed governer method, and as a result, the all speed governer method is differentiated from an automobile minimum and maximum speed control type governer (min. & max. governer). In the case of the commercial diesel engine of the all speed governor method, it is difficult to create the steady driving condition, and as a result, it is difficult to achieve the ash learning. In the exemplary embodiment, in order to solve such a problem, when an accumulated engine driving time after the ash learning is successfully performed reaches a predetermined value, it is determined that driving is performed under an active regeneration condition under which the steady driving condition is possible to decide the active regeneration.

In detail, referring to a block 510, the accumulated engine driving time after succeeding in the previously ash learning is measured. In a block 520, it is examined whether the accumulated engine driving time reaches a predetermined value. The predetermined value may be approximately 800 to 1500 hours. When the accumulated engine driving time reaches the predetermined value, the active regeneration is decided in a block 530. When the accumulated engine driving time does not reach the predetermined value, the process returns to the block 510.

Figure 6:
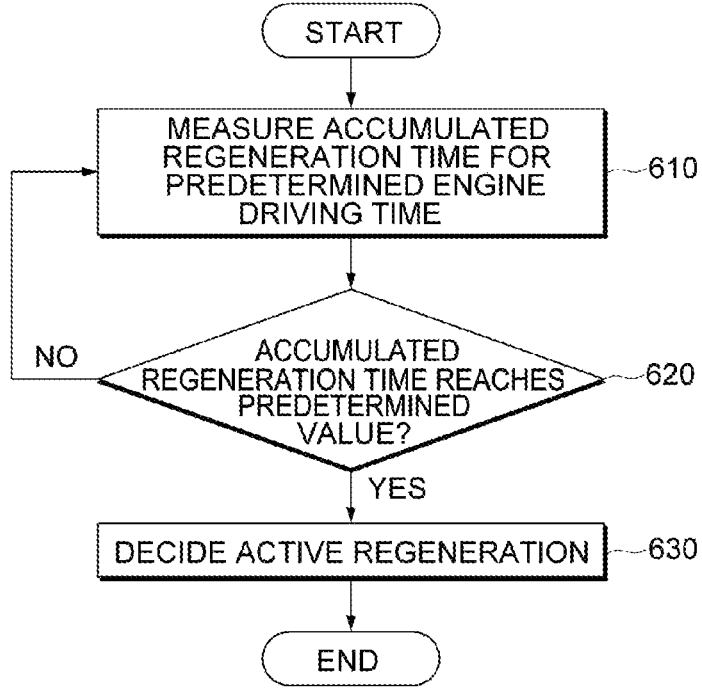
FIG. 6 is a block diagram illustrating a function of the active generation determining unit based on a DPF regeneration frequency according to the exemplary embodiment of the present disclosure.

FIG. 6 is a block diagram illustrating a function of the active generation determining unit based on a DPF regeneration frequency according to the exemplary embodiment of the present disclosure. In general, the DPF regeneration may be frequently repeated within a comparatively short time. As one example, when an absolute DPF regeneration time is short because an operating hour is 5 to 30 minutes after starting the engine, as another example, when the soot reaches the DPF regeneration condition within a short time because the DPF regeneration condition is not good and the soot in the DPF is not completely removed, and as yet another example, when the electronic control unit (ECU) wrongly calculates the soot amount due to an error in the DPF and the differential pressure sensor, the DPF regeneration frequency may be increased.

In this case, when a dilution amount of fuel in oil is more than approximately 10 to 15% to disable lubrication which is an original function of oil due to the frequent DPF regeneration, a problem may occur in the engine. That is, the engine over-runs, and as a result, the engine may be burnt. In order to prevent the engine problem, when an accumulated regeneration time for a predetermined engine driving time is more than a predetermined value, the active regeneration may be decided so that normal regeneration is progressed without neglecting further unsteady DPF regeneration.

In detail, in a block 610, the accumulated regeneration time for the predetermined engine driving time is measured. The predetermined engine driving time may be approximately 50 to 100 hours as one example. In a block 620, it is examined whether the accumulated regeneration time reaches a predetermined value. As one example, the predetermined value may be approximately 200 to 400 hours. When the accumulated regeneration time reaches the predetermined value, the active regeneration may be decided in a block 630. When the accumulated regeneration time does not reach the predetermined value, the process returns to the block 610.

As described above, the active regeneration control device for a DPF according to the exemplary embodiment of the present disclosure includes an active regeneration determining unit, an active regeneration signal generating unit, and an active regeneration inducing unit. The active regeneration determining unit includes one selected from a group that consists of a DPF regeneration process based active regeneration determining unit, a soot amount based active regeneration determining unit, an in-DPF soot distribution based active regeneration determining unit, an ash learning based on active regeneration determining unit, and a DPF regeneration frequency based active regeneration determining unit. As a result, a time of active regeneration can be objectively optimized and judged with respect to a diesel automobile and diesel commercial equipment that are mounted with a manual switch for active regeneration of a DPF. As a result, durability of a DPF system itself can be maintained and a burden to an engine such as dilution of engine oil caused by abnormal regeneration of the DPF, or the like can be reduced.

Although has been described with reference to the drawings and exemplary embodiments, it can be appreciated by those skilled in the art that various modifications and changes of the exemplary embodiments disclosed in the present disclosure can be made within the scope without departing from the spirit of the present disclosure disclosed in the appended claims.

An active regeneration control device for a diesel particulate filter (DPF) according to the present disclosure may be used to induce a driver to perform DPF active regeneration at an optimized time.

Although the present disclosure has been described with reference to exemplary and preferred embodiments, workers skilled in the art will recognize that changes may be made in form and detail without departing from the spirit and scope of the disclosure.

What is claimed is:

1. An active regeneration control device for a diesel particulate filter (DPF), comprising:
    an electronic control unit configured to perform active regeneration determining processes including an ash learning based process which, based on accumulated engine driving time measurement value since succeeding in a previous ash learning, decides active regeneration when the accumulated engine driving time measurement value reaches a predetermined value;
    wherein the electronic control unit is further configured to generate an active regeneration signal according to a decision of the active regeneration determining processes performed by the electronic control unit; and
    wherein the electronic control unit is further configured to induce the active regeneration when the active regeneration is not performed after the active regeneration signal is generated.

2. The device according to claim 1, wherein the active regeneration processes include a DPF regeneration based process that, based on previous regeneration data, extracts the number of times DPF regeneration is performed which is abnormally progressed, and decides active regeneration when the number of DPF regeneration times which is abnormally progressed is equal to or more than a predetermined value.

3. The device according to claim 1, wherein the active regeneration processes include a soot amount based process that, based on a soot measurement amount in the DPF, decides active regeneration when the soot measurement amount reaches a predetermined value.

4. The device according to claim 1, wherein the active regeneration processes include an in-DPF soot distribution based process that, based on accumulated engine driving time measurement value after a DPF regeneration, decides active regeneration when the accumulated engine driving time measurement value reaches a predetermined value.

5. The device according to claim 1, wherein the active regeneration processes include a DPF regeneration frequency based process that, based on an accumulated regeneration time measurement value for a predetermined engine driving time, decides active regeneration when the accumulated regeneration time reaches a predetermined value.

* * * * *